(12) United States Patent
Liao

(10) Patent No.: US 6,495,988 B1
(45) Date of Patent: Dec. 17, 2002

(54) COMBINATIONAL CHARGING MECHANISM

(76) Inventor: Sheng-Hsin Liao, No. 10, Alley 38, Lane 229, San Chun St., Shulin, Taipei Hsien (TW)

(*) Notice: Subject to any disclaimer, the term of this patent is extended or adjusted under 35 U.S.C. 154(b) by 0 days.

(21) Appl. No.: 09/910,885

(22) Filed: Jul. 24, 2001

(30) Foreign Application Priority Data

Jul. 9, 2001 (TW) .................................... 90211498 U

(51) Int. Cl.⁷ .................................................. H02J 7/00
(52) U.S. Cl. ...................................... 320/111; 320/114
(58) Field of Search .............................. 320/111, 112, 320/113, 114, 115

(56) References Cited

U.S. PATENT DOCUMENTS

| | | | | |
|---|---|---|---|---|
| 3,890,555 A | * | 6/1975 | Nelson et al. | 320/165 |
| 4,747,034 A | * | 5/1988 | Dickey | 363/134 |
| 5,648,712 A | * | 7/1997 | Hahn | 320/111 |
| 5,923,147 A | * | 7/1999 | Martensson | 320/111 |

* cited by examiner

Primary Examiner—Gregory J. Toatley, Jr.
(74) Attorney, Agent, or Firm—Rosenberg, Klein & Lee

(57) ABSTRACT

The present invention provides a combinational charging mechanism comprising a main body, a transformer circuit unit, and a bearing seat. The main body has a receiving room therein. The transformer circuit unit is received in the receiving room of the main body. The transformer circuit unit has connection points. The transformer circuit unit joins a first plug and a cable. The other end of the cable joins a second plug. A bearing seat is joined at the outside of the main body. The connection points stick into the bearing seat. A charging mechanism having both travel-charging function and desktop-charging function is thus formed.

5 Claims, 10 Drawing Sheets

COMBINATIONAL CHARGING MECHANISM

FIELD OF THE INVENTION

The present invention relates to a combinational charging mechanism and, more particularly, to a combinational charging mechanism having both travel-charging and desktop-charging functions, which can be simultaneously used.

BACKGROUND OF THE INVENTION

Along with continual progress of information technology, portable electronic devices such as mobile phones and personal digital assistants (PDAs) have become articles of frequent use in everyday lives of people. General portable electronic devices use chargeable Li batteries, Ni—MH batteries, or Ni—Cd batteries to provide required electricity.

As shown in FIG. 1, a conventional travel charger 10a comprises a main body 11a, which has a transformer circuit unit (not shown) therein. The input end of the transformer circuit unit joins a first plug 12a, and the output end thereof joins a cable 13a. The other end of the cable 13a joins a second plug 14a. The first plug 12a can be plugged into a socket of 110V or 220V alternating current (AC). Through the function of the transformer circuit unit, a direct current is obtained. The direct current is transferred to the second plug 14a via the cable 13a. The second plug 14a is then plugged into a portable electronic device 20a such as a mobile phone to charge it.

However, the above charger can only provide travel-charging function to directly charge a mobile phone or a PDA, and cannot charge a second battery as a desktop charger. It is necessary to purchase another charging seat, hence increasing economic burden to a user.

Moreover, when the charging seat is to be used, it is necessary to connect the charger and the charging seat. At this time, only desktop-charging function can be provided, and travel-charging function cannot be used. Therefore, travel-charging and desktop-charging functions of the prior art charger and charging seat cannot be used simultaneously, hence limiting their usage and resulting much inconvenience for the user.

SUMMARY OF THE INVENTION

The primary object of the present invention is to provide a combinational charging mechanism, which can provide travel-charging and desktop-charging functions. It is not necessary to purchase another charging seat, hence lessening economic burden to a user. Moreover, travel-charging and desktop-charging functions can be used simultaneously, resulting in more flexible use. Therefore, the user can flexibly choose either travel-charging function or desktop-charging function to use, or can use both of them simultaneously.

To achieve the above object, the present invention provides a combinational charging mechanism comprising a main body, a transformer circuit unit, and a bearing seat. The main body has a receiving room therein. The transformer circuit unit is received in the receiving room of the main body. The transformer circuit unit has connection points. The transformer circuit unit joins a first plug and a cable. The other end of the cable joins a second plug. The bearing seat is joined on the main body. The connection points stick into the bearing seat. A charging mechanism is thus formed.

The various objects and advantages of the present invention will be more readily understood from the following detailed description when read in conjunction with the appended drawing, in which:

DETAILED DESCRIPTION OF THE PREFERRED EMBODIMENTS

Figure 1:
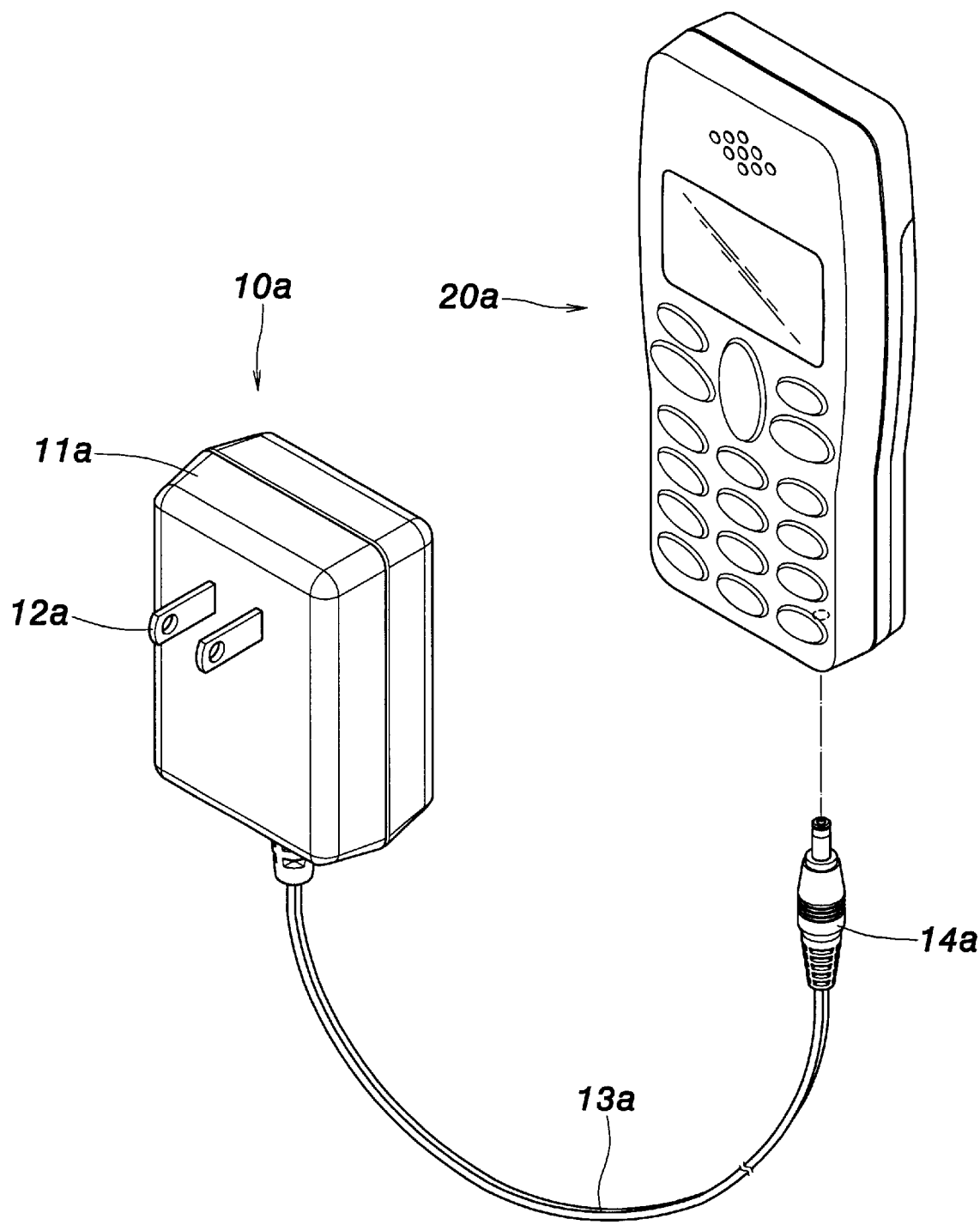
FIG. 1 is perspective view of a prior art charger.
Figure 2:
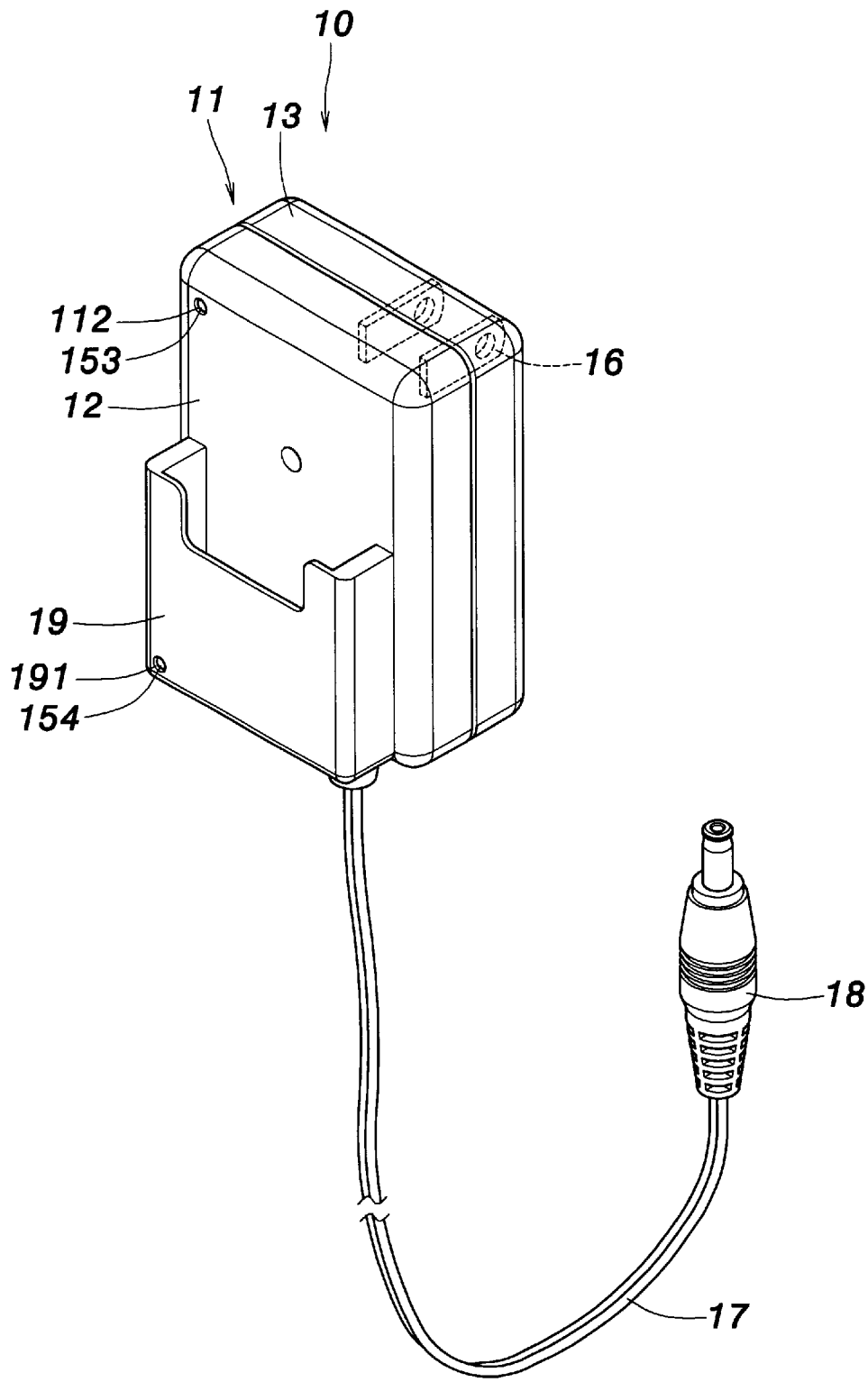
FIG. 2 is a perspective view of a first embodiment of the present invention.
Figure 3:
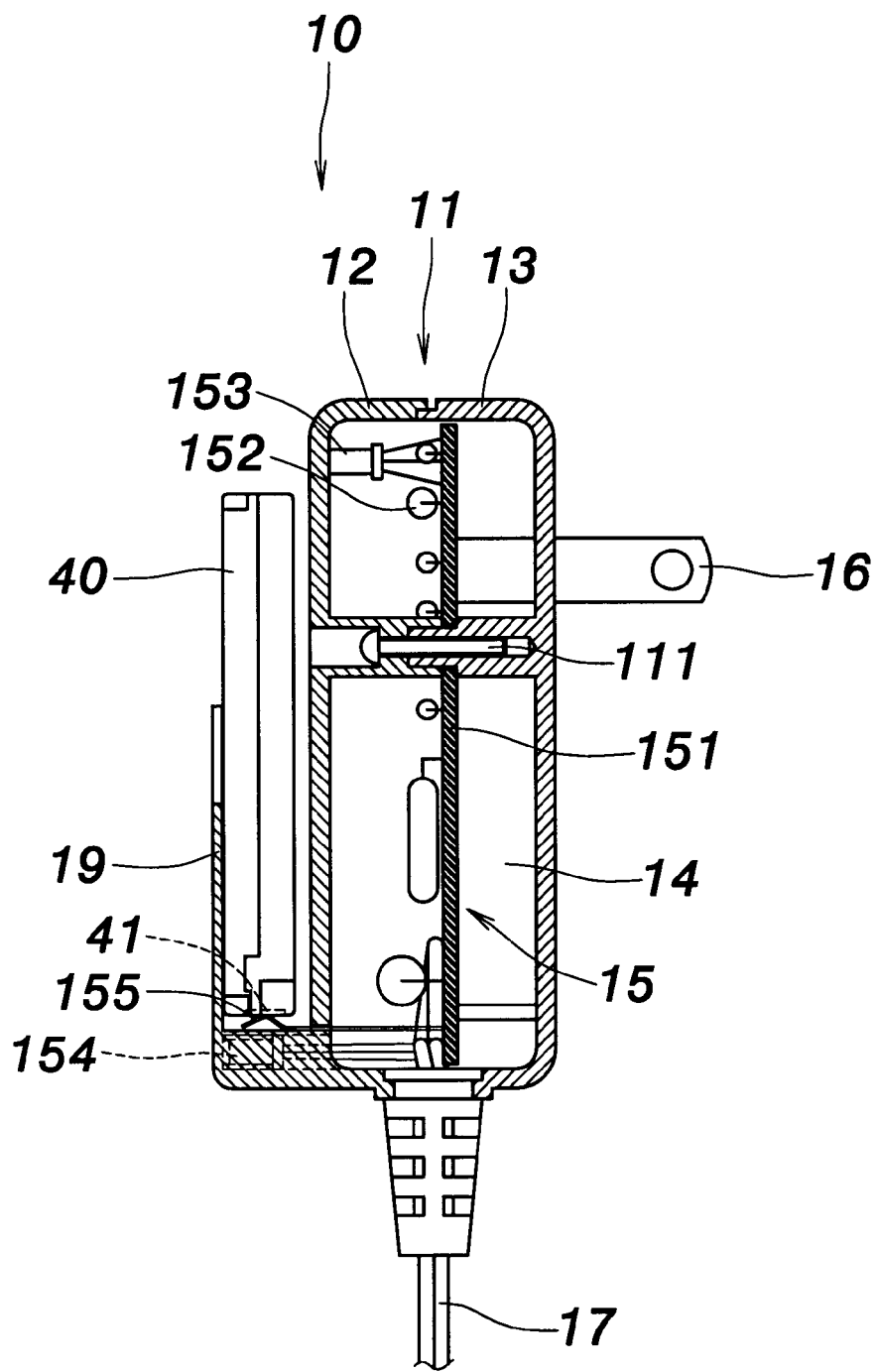
FIG. 3 is a cross-sectional view of the first embodiment of the present invention.

As shown in FIGS. 2 and 3, a combinational charging mechanism 10 according to a preferred embodiment of the present invention comprises a main body 11, which is a hollow shell body formed by retaining or screwing with screws 111 a first half body 12 and a second half body 13. The main body 11 has a receiving room therein to receive a transformer circuit unit 15.

The transformer circuit unit 15 comprises a circuit board 151 and a plurality of electronic components 152. The circuit board 151 has a first power light 153, a second power light 154, and a plurality of resilient contact sheets 155 thereon. The first and second power lights 153 and 154 are light sources such as light-emitting diodes (LEDs) or light bulbs. The main body 11 has a first through hole 112 corresponding to the first power light 153 so that light from the first power light 153 can project out via the first through hole 112. The second power light 154 and the contact sheets 155 protrude out of the main body 11.

The input end of the transformer circuit unit 15 joins a first plug 16, and the output end thereof joins a cable 17. The other end of the cable 17 joins a second plug 18. The transformer circuit unit 15 can also be a linear transformer.

A bearing seat 19 is joined at the outside of the main body 11. The bearing seat 19 can be integrally joined on the main body 11, or can be separably joined on the main body 11. In this embodiment, the bearing seat 19 is integrally joined on the main body 11. The bearing seat 19 and the main body 11 are integrally formed by means of mold ejection.

The bearing seat 19 is a hollow shell body. The look of the bearing seat 19 is not restricted, and can vary according to different necessities. The top of the bearing seat 19 is open so that a battery can be conveniently inserted into the bearing seat 19. The bearing seat 19 has a second through hole 191 corresponding to the second power light 154 so that light from the second power light 154 can project out via the second through hole 191. One end of each of the contact sheets 155 can be bent to form a V-shaped or circular arc shaped projective connection point, which sticks into the bottom inside the bearing seat 19.

Figure 4:
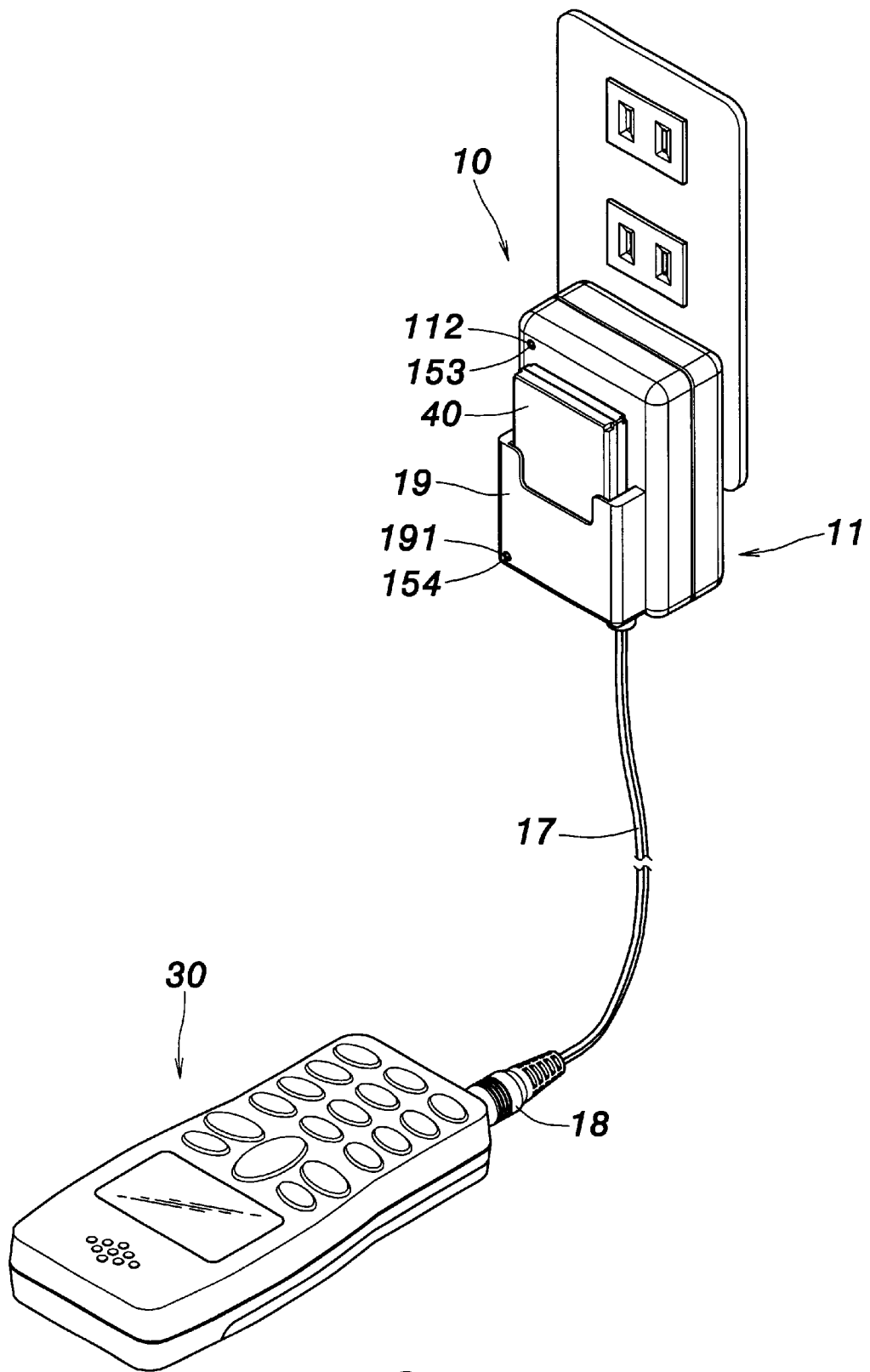
FIG. 4 is shows a use state of the first embodiment of the present invention.

Please refer to FIGS. 3 and 4. The first plug 16 can be plugged into a socket of 110V or 220V AC. Through the function of the transformer circuit unit 15, a direct current is obtained. The direct current is transferred to the second plug 18 via the cable 17. The second plug 18 can then be plugged into a portable electronic device 30 such as a mobile phone to charge it. This is for providing travel-charging function, whose use state can be known through the first power light 153.

Additionally, when the first plug 16 is plugged into a socket of 110V or 220V AC to obtain a direct current through the function of the transformer circuit unit 15, the direct current can also be transferred to the contact sheets 155. A battery 40 to be charged can be inserted into the bearing seat 19 to let contact terminals at the bottom of the battery 40 achieve electric connection with the connection points of the contact sheets 155 of the charging mechanism 10. Therefore, the contact sheets 155 can charge the battery 40 inserted into the bearing seat 19. This is for providing desktop-charging function, whose use state can be known through the second power light 154.

Therefore, the charger of the present invention can provide travel-charging and desktop-charging functions. If desktop-charging function needs to be used, it is not necessary to purchase another charging seat, hence lessening economic burden to a user. Moreover, because the bearing seat 19 is joined on the main body 11 and does not occupy additional placement space, its use is very convenient.

Furthermore, when the bearing seat 19 is to be used to provide desktop-charging function, the second plug 18 for providing travel-charging function can also be used simultaneously. Therefore, the present invention can achieve travel-charging and desk top-charging functions simultaneously to charge the portable electronic device and the battery 40 simultaneously, hence resulting i n flexible usage. Briefly speaking, the user can flexibly choose to use either travel-charging function or desktop-charging function, or can use both of them simultaneously.

Figure 5:
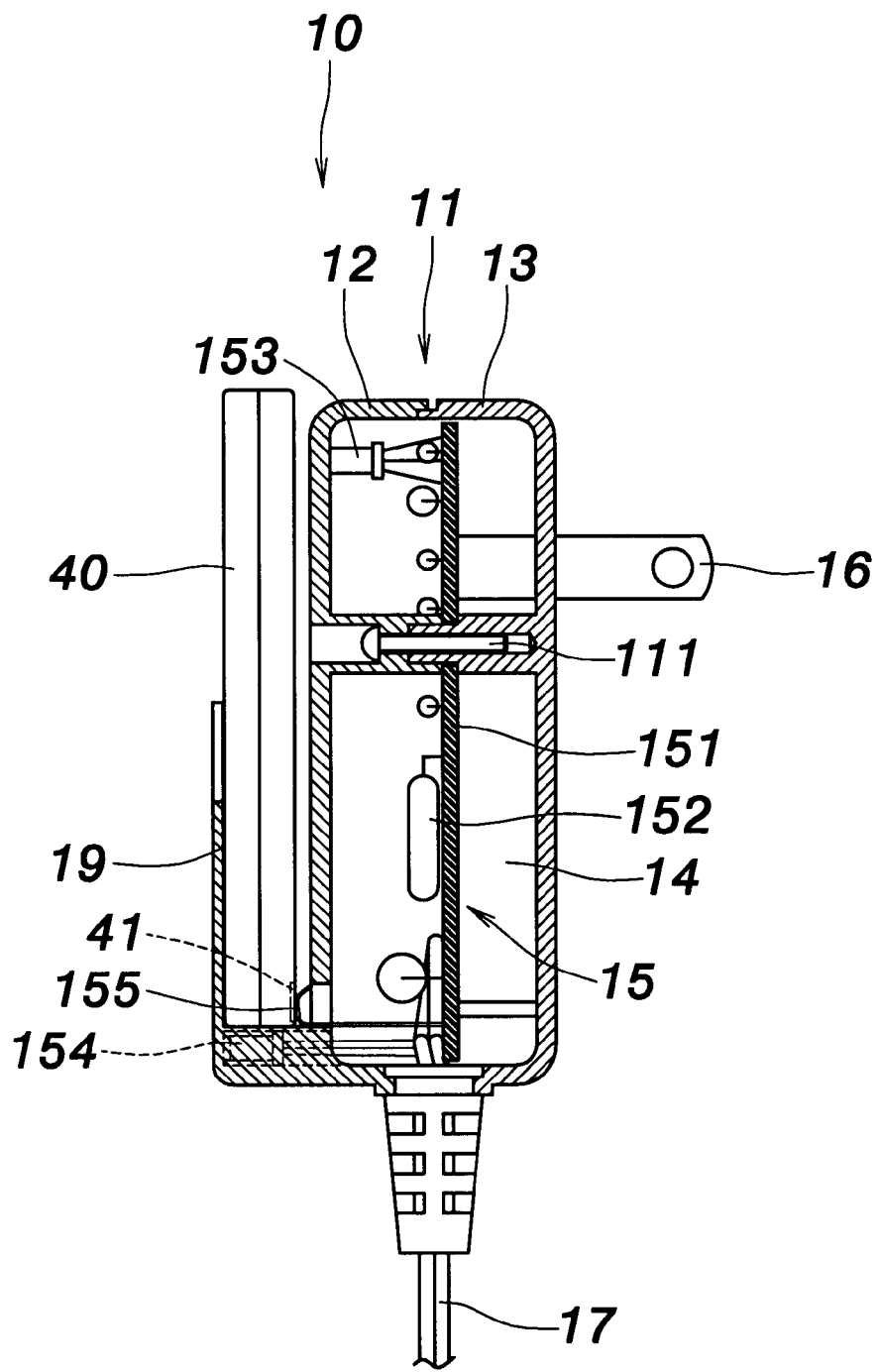
FIG. 5 is a cross-sectional view of a second embodiment of the present invention.

Please refer to FIG. 5. Shapes and positions of the contact sheets 15 of the present invention can vary according to different necessities so that the contact terminals 41 at the rear side of the battery 40 can achieve electric connection with the contact sheets 155 of the charging mechanism 10.

Figure 6:
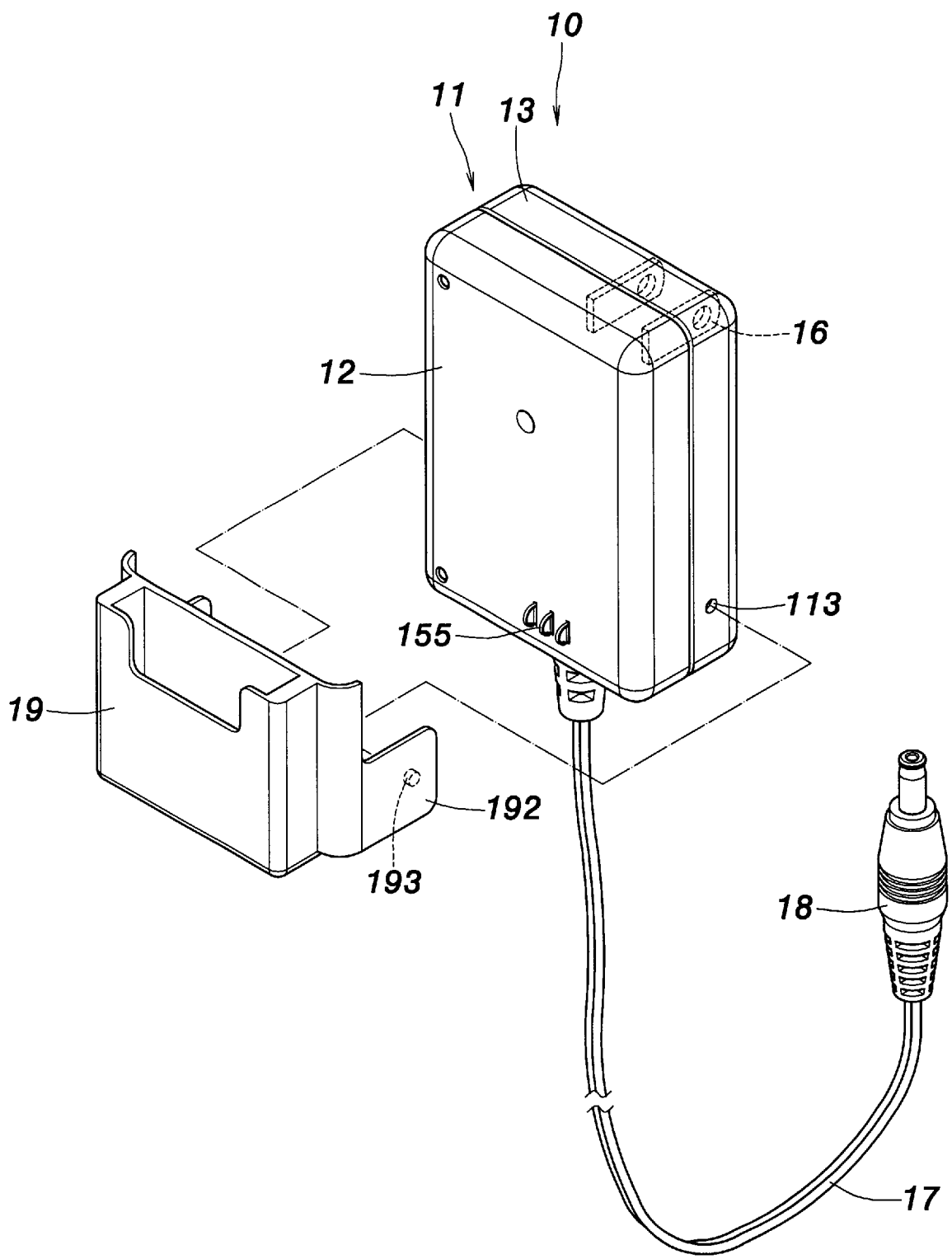
FIG. 6 is a perspective view of a third embodiment of the present invention.

Please refer to FIG. 6. The bearing seat 19 can be separably joined on the main body 11. Left and right sides of the bearing seat 19 extend to form connection sheets 192. The inner sides of the connection sheets 192 have projective bodies 193, and left and right sides of the main body 11 have corresponding concave holes 113. The projective bodies 192 and the concave holes 113 can be matched and retained with each other so that the bearing seat 19 can be retained on the main body 11. When it is not necessary to use desktop-charging function, the bearing seat 19 can be separated from the main body 11.

Figure 7:
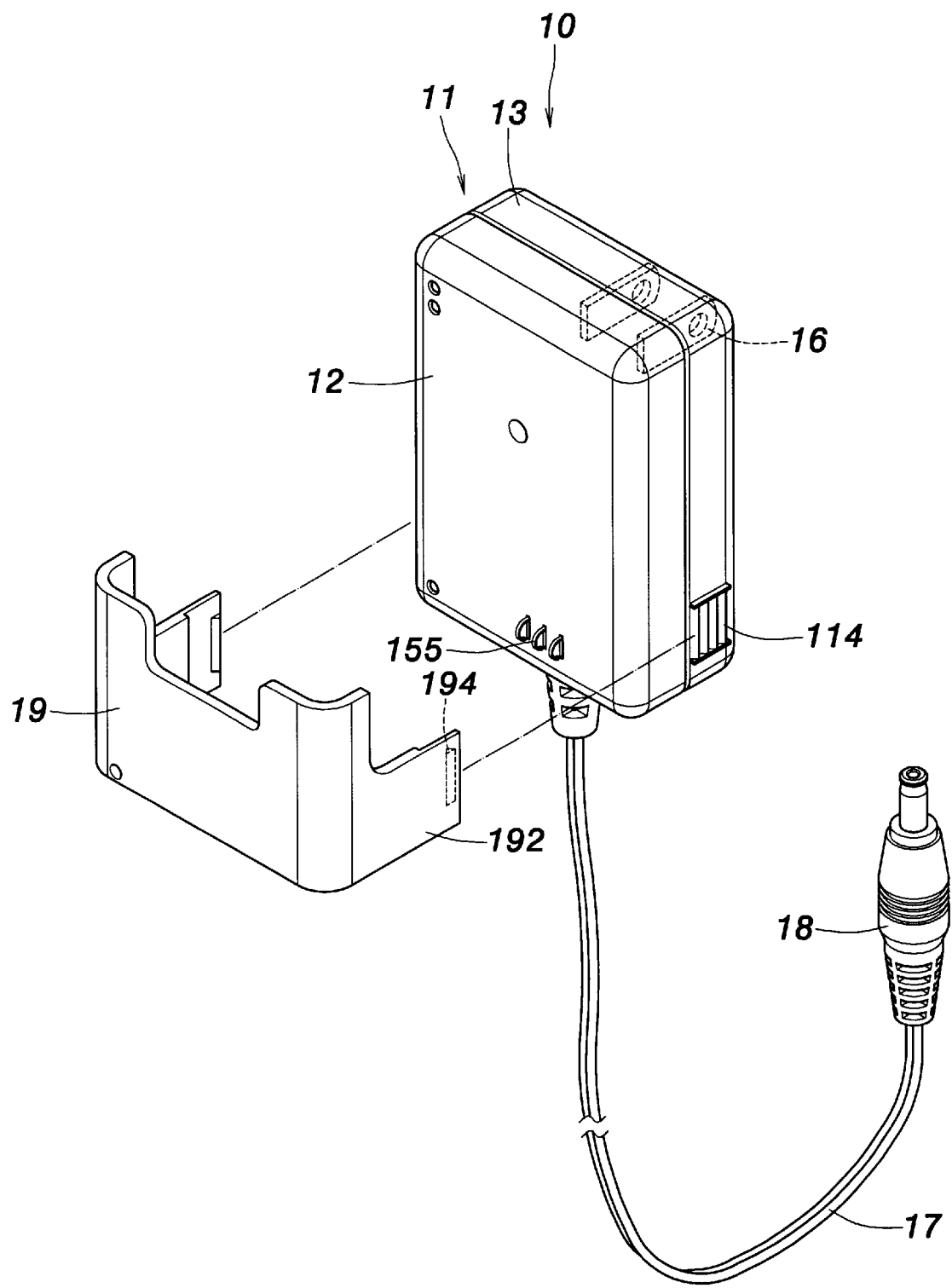
FIG. 7 is perspective view of a fourth embodiment of the present invention.
Figure 8:
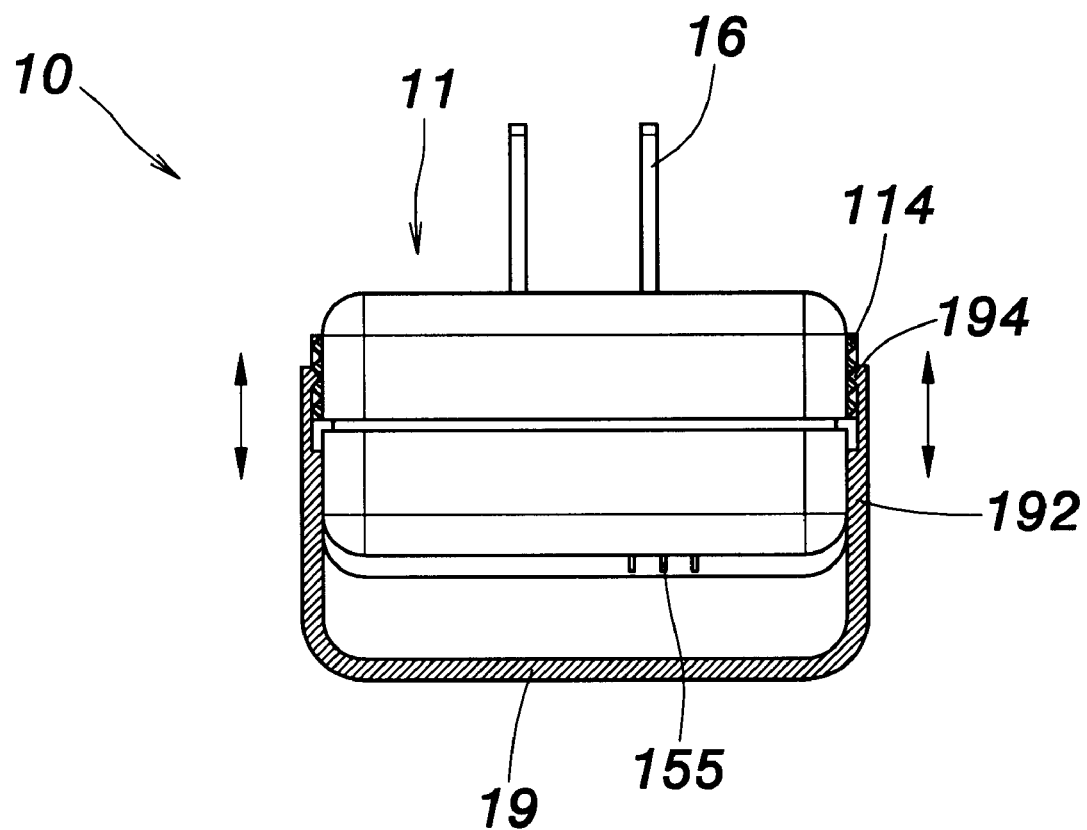
FIG. 8 shows an adjustment state of the fourth embodiment of the present invention.

Please refer to FIGS. 7 and 8. The bearing seat 19 can be separably joined on the main body 11. Left and right sides of the bearing seat 19 extend to form the connection sheets 192. The inner sides of the connection sheets 192 have positioning bodies 194, and left and right sides of the main body 11 have corresponding multi-section positioning teeth 114. The positioning bodies 194 resiliently mesh with the positioning teeth 114 so that the bearing seat 19 can be adjustably joined on the main body 11. The bearing seat 19 can be pulled and adjusted to change the size of the inner space of the bearing seat 19 to apply to different types of batteries. When it is not necessary to use desktop-charging function, the bearing seat 19 can be separated from the main body 11, or can be pressed downwards to shrink the volume. Additionally, the bearing seat 19 can be designed to be capable of adjusting its height up and down to apply to batteries of different heights, and shrinking the volume to a smaller one when not used.

Figure 9:
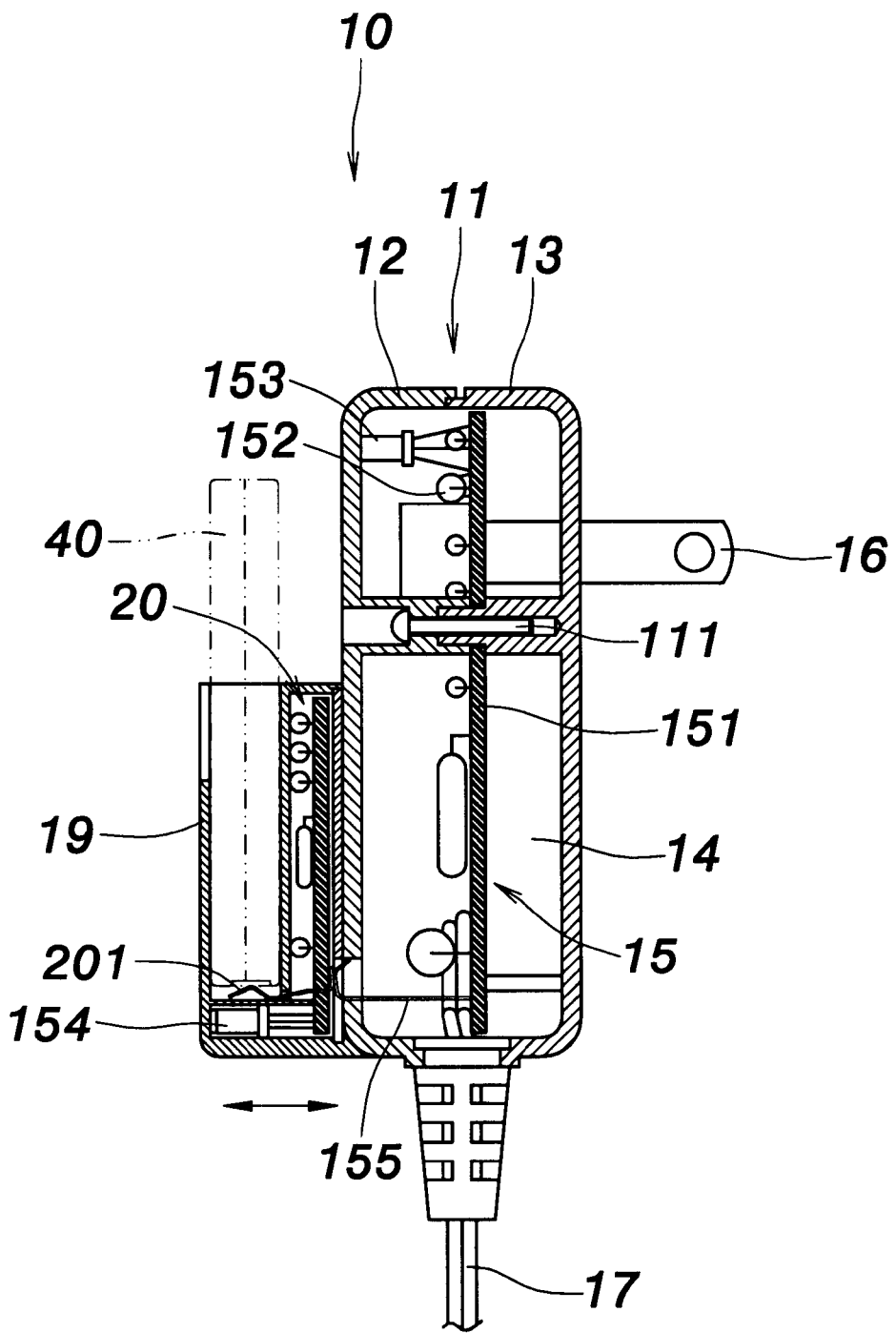
FIG. 9 shows an adjustment state of a fifth embodiment of the present invention.

Please refer to FIG. 9. The bearing seat 19 can be separably joined on the main body 11. The bearing seat 19 has a separate transformer circuit unit 20 therein. The separate transformer circuit unit 20 has a plurality of conducting sheets 201. One end of each of the conducting sheets 201 achieves electric connection with one of the connection points of the contact sheets 155. The other end thereof is situated at the bottom inside the bearing seat 19. When the battery 40 is inserted into the bearing seat 19, the contact terminals at the bottom of the battery 40 can achieve electric connection with the conducting sheets 201 so that the conducting sheets 201 and the contact sheets 155 can charge the battery 40 inserted into the bearing seat 19. When it is not necessary to use desktop-charging function, the bearing seat 19 can be separated from the main body 11. The separate transformer circuit unit 20 can also be separated form the main body 11.

Figure 10:
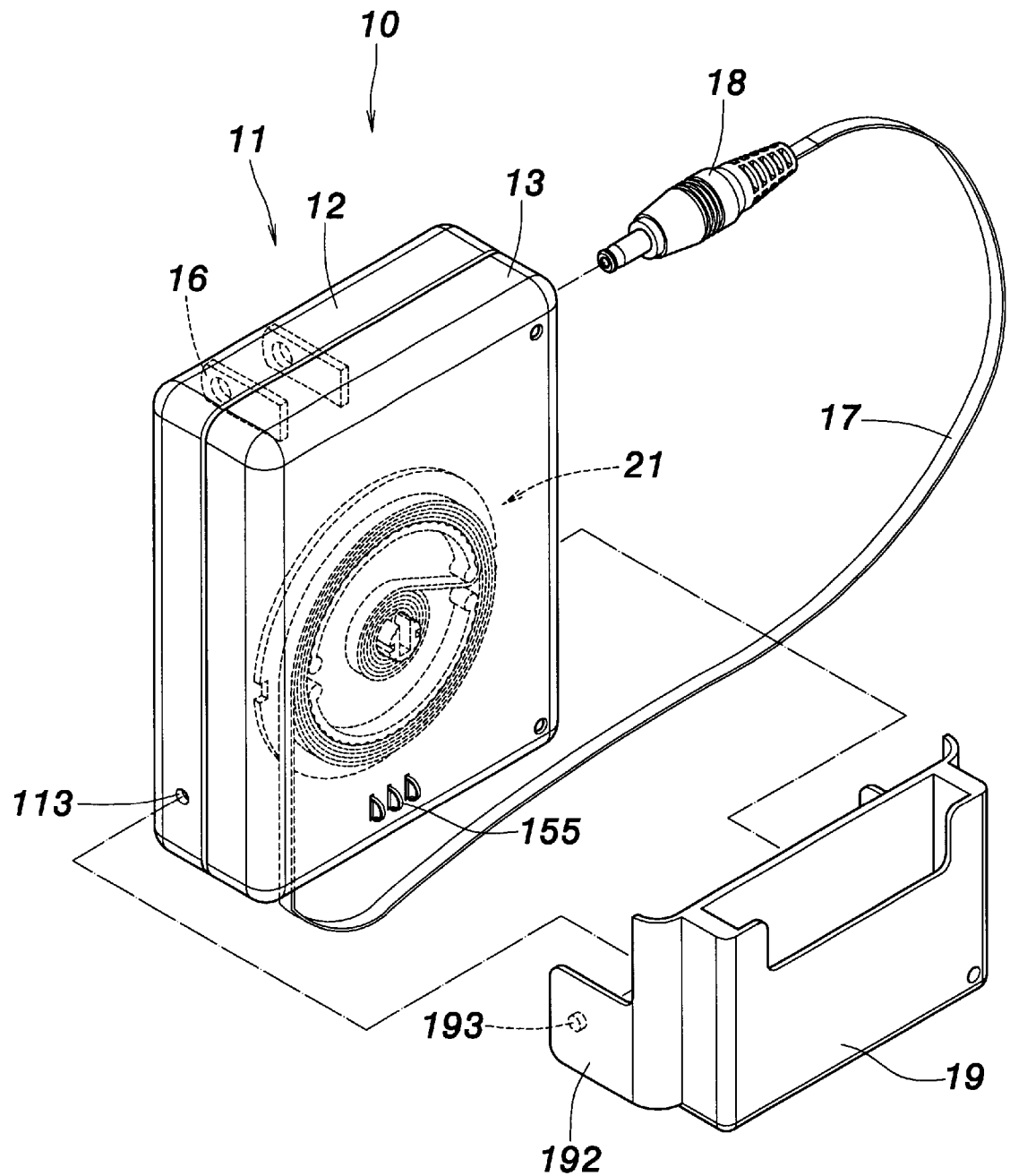
FIG. 10 is a perspective view of a sixth embodiment of the present invention.

Please refer to FIG. 10. The inside of the main body can have a wire-winding unit 21. The cable 17 can be wound into the wire-winding unit 21 so that the cable 17 can be selectively wound into the main body or pulled out of the main body 11, thereby adjusting its length according to necessity at any time. Therefore, entanglement of the cable due to a too-long length of external wire will not arise.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A combinational charging mechanism, comprising;
  a main body having a receiving room therein, said main body having a wire-winding unit therein, and a cable being reversibly wound into said wire-winding unit;
  a transformer circuit unit received in said receiving room of said main body, said transformer circuit unit having connection points, said transformer circuit unit joining as first plug and a cable, the other end of said cable joining a second plug; and,
  a bearing seat adjustably joined on said main body to form a battery receiving space therebetween, said connection points extending into said battery receiving space of said bearing seat, said bearing seat being adjustable to vary a volume of said battery receiving space and thereby accommodate batteries of different sizes.

2. A combinational charging mechanism, comprising:
  a main body having a receiving room therein;
  a transformer circuit unit received in said receiving room of said main body, said transformer circuit unit having connection points, said transformer circuit unit joining a first plug and a cable, the other end of said cable joining a second plug; and,
  a bearing seat joined on said main body to form a battery receiving space therebetween, said connection points extending into said battery receiving space of said bearing seat, said bearing seat being adjustably joined to said main body to vary a volume of said battery receiving space and thereby accommodate batteries of different sizes.

3. The combinational charging mechanism as claimed in claim 2, wherein left and right sides of said bearing seat extend to form connection sheets, insides of said connection sheets having projective bodies, left and right sides of said main body having corresponding concave holes, said projective bodies and said concave holes being matched and retained with each other so that said bearing seat can be joined on said main body.

4. The combinational charging mechanism as claimed in claim 2, wherein left and right sides of said bearing seat extend to form connection sheets, insides of said connection sheets having positioning bodies, left and right sides of said main body having corresponding multi-section positioning teeth, said positioning bodies resiliently meshing with said positioning teeth so that said bearing seat can be adjustably joined on said main body and can be adjustably pulled.

5. The combinational charging mechanism as claimed in claim 2, wherein said bearing seat has a separate transformer circuit unit therein, said separate transformer circuit unit having conducting sheets, one end of each of said conducting sheets achieving electric connection with one of said connection points, the other end of each of said conducting sheets being situated inside said bearing seat.

\* \* \* \* \*